United States Patent [19]

Brouwer et al.

[11] Patent Number: 4,659,234
[45] Date of Patent: Apr. 21, 1987

[54] EMISSIVITY ERROR CORRECTING METHOD FOR RADIATION THERMOMETER

[75] Inventors: Nicholaas L. Brouwer, Allegheny Township, Allegheny County; John M. Urbanic, Churchill Borough; Albert R. Anderson, White Valley, all of Pa.

[73] Assignee: Aluminum Company of America, Pittsburgh, Pa.

[21] Appl. No.: 849,160

[22] Filed: Apr. 7, 1986

Related U.S. Application Data

[63] Continuation-in-part of Ser. No. 621,698, Jun. 18, 1984, abandoned.

[51] Int. Cl.$^4$ ................................................ G01J 5/00
[52] U.S. Cl. ........................................ 374/121; 374/126; 374/127; 250/339; 250/340
[58] Field of Search ............... 374/9, 121, 126–129; 356/43–45; 250/338 R, 338 PY, 338 SE, 339

[56] References Cited

U.S. PATENT DOCUMENTS

| | | | |
|---|---|---|---|
| 2,237,713 | 4/1941 | Russell | 356/45 |
| 3,922,550 | 11/1975 | Crowley et al. | 374/9 |
| 4,561,786 | 12/1985 | Anderson | 374/127 |

FOREIGN PATENT DOCUMENTS

| | | | |
|---|---|---|---|
| 2123480 | 11/1972 | Fed. Rep. of Germany | 356/45 |
| 134324 | 10/1980 | Japan | 374/126 |
| 52532 | 3/1983 | Japan | 356/45 |

OTHER PUBLICATIONS

European patent application to Rudolf, No. 0119724, published Sep. 1984, now U.S. Pat. No. 4,579,461.

Primary Examiner—Charles Frankfort
Assistant Examiner—W. Morris Worth
Attorney, Agent, or Firm—Elroy Strickland

[57] ABSTRACT

A method of more accurately measuring the true surface temperature of metal alloy objects without contacting the same. The surfaces of the objects have unknown emissivities that change and that are less than unity. The method includes the step of providing objects having surfaces that radiate infrared energy. The radiated energy is measured at two wavelengths, and a first measurement is provided that is a function of the ratio of the energies at the two wavelengths. The radiated energy is also measured at a single, narrow band wavelength, and a second measurement is provided that is a function of the radiated energy. The two measurements are then electrically combined to provide measurements of radiated energy and thus temperature measurements that are or at least are closer to the true temperature than either of the first or second measurements.

1 Claim, 4 Drawing Figures

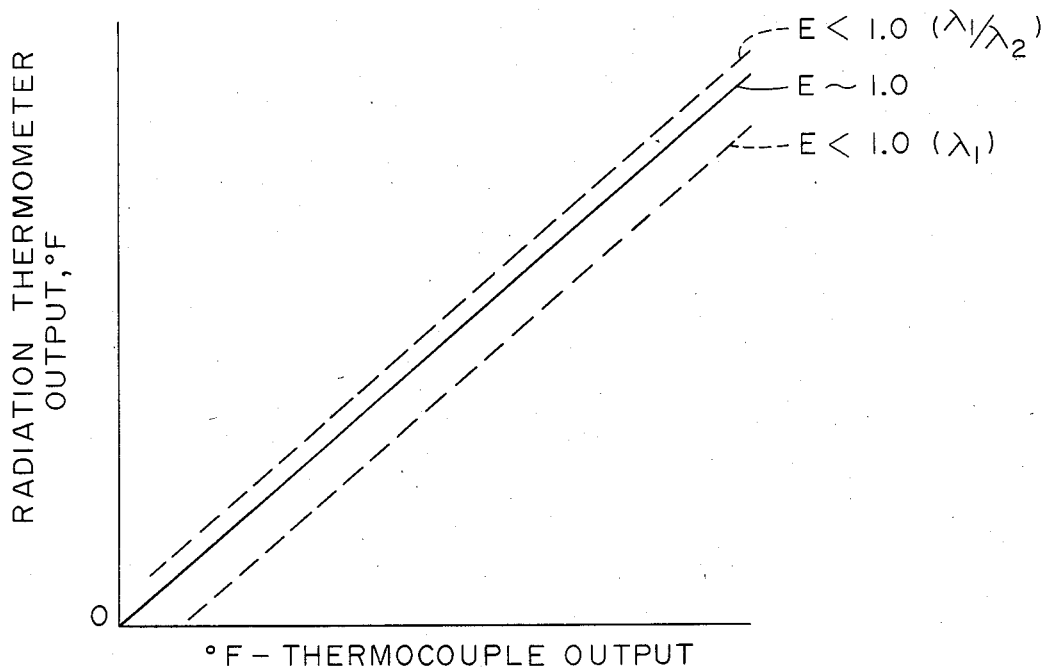
FIG. 1 – BLACK BODY CALIBRATION
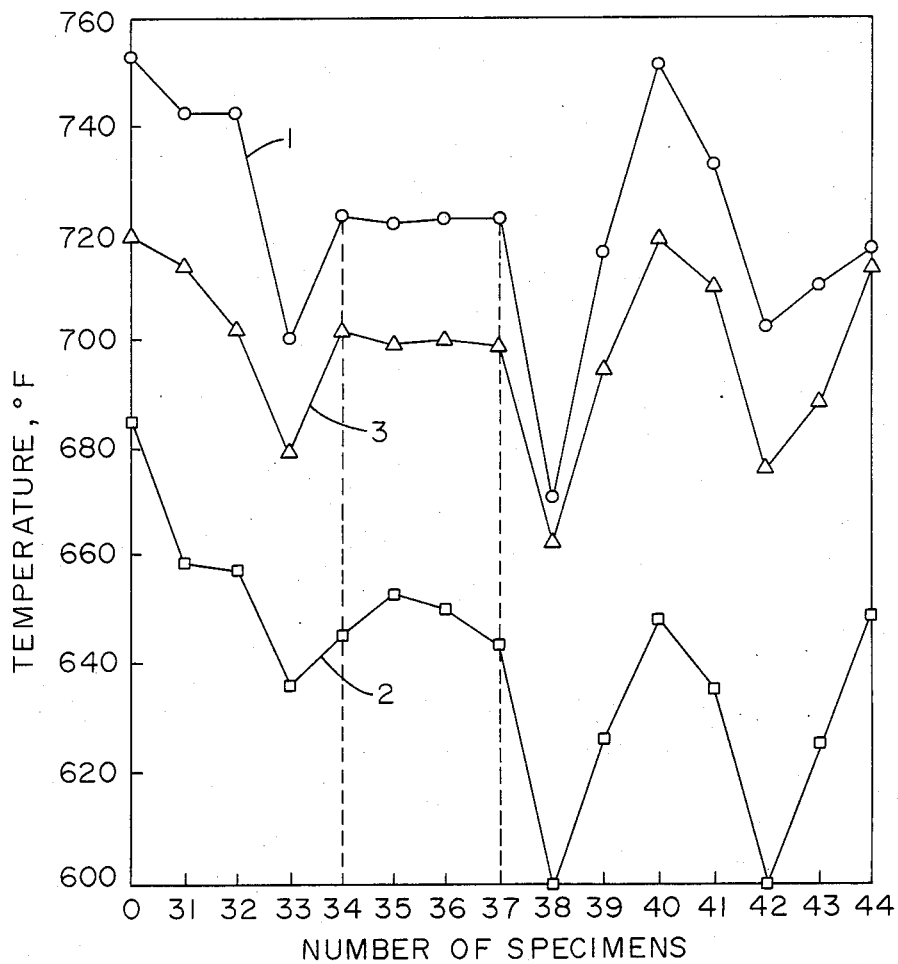
FIG. 2

EMISSIVITY ERROR CORRECTING METHOD FOR RADIATION THERMOMETER

This application is a continuation-in-part of U.S. application Ser. No. 621,698, filed June 18, 1984 now abandoned.

BACKGROUND OF THE INVENTION

The invention relates generally to measuring the temperature of heated metal surfaces without contacting the same, and particularly to a method of correcting inherent errors in temperature readings due to changes in the emissivity of heated aluminum surfaces by a novel calibration procedure that compensates for the temperature errors due to changes in emissivity.

A perfect radiator or black body is characterized by the fact that the energy which it emits depends only on the absolute temperature of the body. A non-black body or grey body radiator emits then only a fraction of the energy emitted by a perfect radiator, the fraction being dependent on the emissivity of the body. Thus, in order to relate energy emitted by a non-black body to true temperature, its emissivity must be compensated for.

The emissivity of an opaque body is expressed as the ratio of radiated energy emitted from a near black body to the energy emitted from a black body, both at the same absolute temperature.

Emissivity is also related to incident radiation that is reflected by the body by the equation $E+R=1$, i.e., when the emissivity is unity, the reflectivity is 0, and the emitted energy is directly related to the true body surface temperature. However, non-black bodies, such as heated aluminum surfaces, are partial reflectors of radiation, such that their emissivity is always less than unity. Hence, the total energy leaving an area of such a body will, in general, not be directly related to true surface temperature unless its emissivity is determined and an appropriate correction applied.

An aluminum alloy object is particularly troublesome, as the emissivity of its surfaces often changes from one discreet area to the next. Similarly, the emissivities of a plurality of equal temperature objects can change from object to object. One primary reason for this lies in the varying roughness of the surfaces. Another reason lies in varying alloy constituents of the materials of the objects, which constituents oxidize in varying degrees, depending on such parameters as the temperature value to which the objects are exposed and length of time the objects are maintained at the temperature value. Also, the length of time the objects are exposed to the atmosphere before heating affects emissivity, as well as the constituency of the atmosphere itself.

Further, any dust and dirt in the atmosphere and in furnaces employed to heat the objects, and any substances applied to the objects in the course of the manufacture thereof, such as lubricating oils and/or cooling emulsions, affect the emissivity of the surfaces. One furnace in a plant, for example, will be relatively clean and therefore heat metal ingots, without depositing contaminants thereon while another furnace in the same plant will be relatively dirty and hence produce ingot surfaces that have received and contain such dirt.

For these reasons, heated surfaces offer varying degrees of emissivity such that determining their true temperature with radiation thermometers is unreliable, this being true for all processes, including rolling, forging, casting and extruding, and the products thereof, such as metal plate and sheet, forgings, castings and extrusions.

Commercially available, single wavelength, narrow band radiation thermometers provide an output signal that is a linear function of the infrared energy radiated from heated surfaces. All such thermometers are calibrated from a black body source ($E \cong 1.0$). Therefore, unless a surface has a characteristic black body value, the single wavelength thermometer indicates a relative temperature value that is lower than the absolute surface temperature of the body. The difference between the true temperature of the surface and that of the lower relative temperature value indicated by a single radiation thermometer is a function of surface emissivity; the lower the surface emissivity, the lower the measured temperature value.

In the case of commercial two-color or dual wavelength ratio radiation thermometers, a linearized output reading as a function of temperature can be made to behave in a manner opposite to the single wavelength thermometer, i.e., the lower the surface emissivity, the higher the apparent temperature reading, as compared to the black body calibration value. An electric circuit capable of ratioing output signals of two detectors is used, thereby cancelling emissivity measurement error if surface emissivity ratio values are equal or constant at both selected wavelengths, which is the case at grey body conditions. For this reason, the dual wavelength ratioing thermometer provides a substantially more accurate indication of true surface temperature than the single wavelength technique, especially for grey body or near-grey body surfaces.

BRIEF SUMMARY OF THE INVENTION

The present invention is directed to a method of measuring infrared energy at at least two wavelengths as it radiates from a narrow discreet area or portion of a heated surface. Output signals are developed that are representative of the measured radiated energy at each wavelength and are employed to correct for and thereby minimize errors in the sensing process due to changing emissivities of the heated surfaces. More specifically, by using a single and dual wavelength radiation sensing technique, as discussed above, the relatively large error of the single wavelength technique is employed to correct further the relatively smaller error of the dual wavelength technique. This is accomplished by electrically adding the output signals of the single wavelength measurement and the ratioed output of the dual wavelength measurement. This electrical addition of the temperature related output signals allows selection of an output signal that can be adjusted to read true temperature from a maximum negative error range (single wavelength output signal) to a maximum positive error range (dual wavelength output signal). A number of emissivity values varying to a large amount at either extreme of the signal adjustment range will exhibit a reduced difference at the zero error crossover point. This point then becomes the correction setting at which the radiation thermometer temperature readings are least affected by emissivity variations. This setting is obtained by calibration of the radiation thermometer using an absolute temperature measurement means (thermocouple, for example) on the actual surface to be measured. The wavelength of the single wavelength measurement is preferably one of the two wavelengths employed for the dual wavelength ratioing.

BRIEF DESCRIPTION OF THE DRAWINGS

The invention, along with its advantages and objectives, will be best understood from consideration of the following detailed description in connection with the accompanying drawings in which:

FIG. 1 is a typical graph showing black body and grey body calibration plots for a single and a dual wavelength ratio radiation thermometer, the plot being a 45° linear curve extending between XY coordinates;

FIG. 2 is a graph showing individual temperature readings of a number of heated aluminum specimens provided by single and dual wavelength radiation thermometer and thermocouple measurements, each specimen having a somewhat different surface emissivity and temperature value;

PREFERRED EMBODIMENT

Figure 3:
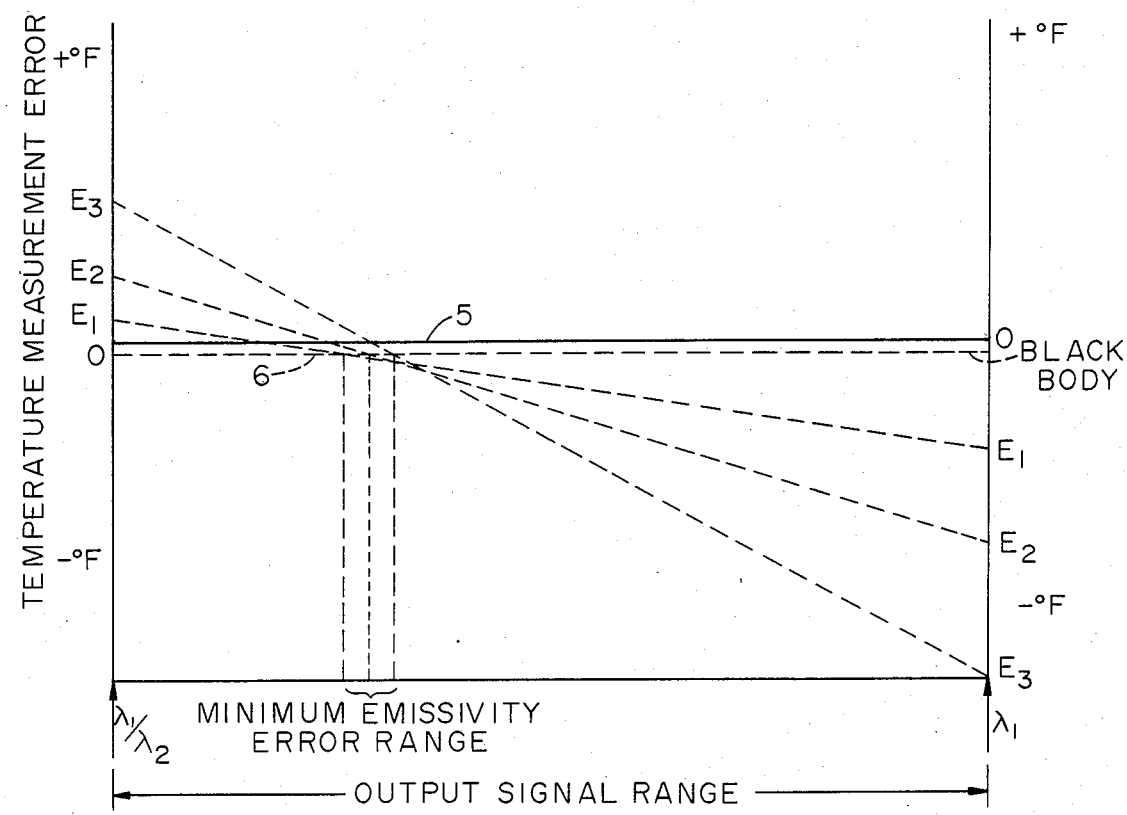
FIG. 3 shows plots of temperature errors for a black body surface and for non-black body surfaces having different, less than unity, emissivity values at a selected temperature, as obtained by single and dual wavelength ratio measuring techniques and a thermocouple measurement.

Referring now to the plots of FIG. 1 of the drawings, a center, solid line is shown as a 45° linear curve, the curve being plotted between an X axis, representing measurements of temperature taken with reference to thermocouples disposed in direct, physical contact with heated surfaces, and a Y axis representing measurements of temperature taken with a radiation thermometer receiving infrared radiation from the heated surfaces. The center curve represents the relationship of thermocouple versus radiation thermometer measurements on a black body object (E~1.0).

In addition, FIG. 1 shows temperature curves (dash lines) of a heated non-black body (E<1.0) as measured by a single ($\lambda_1$) and a dual ($\lambda_1/\lambda_2$) wavelength radiation measuring technique, the radiation being received by a sensor from a narrow, discreet area of the surface under test. The three curves of FIG. 1, then, allow comparison of black body calibration curves of the two-wavelength ratioing technique and the single wavelength technique.

Referring now to FIG. 2 of the drawing, the plots in the figure are indications of the temperature values (in °F. along the Y axis of the graph of the plots) of a substantial number of heated aluminum specimens, the number of specimens (0 to 44) being indicated along the X axis of the graph. The plots are the respective outputs of two, separate, black body calibrated, radiation thermometers (not shown) that were employed to sense the temperatures of the specimens. The plots are indicated by numerals 1 and 2. As indicated, the lower one (line 2) of the two plots represents the output of a radiation thermometer capable of measuring infrared radiation at a single wavelength, a commonly used wavelength being approximately 2.1 microns. The upper plot (line 1) in the figure represents the ratioed output of a dual wavelength, infrared sensing radiation thermometer sensing infrared energy at typically 2.1 and 2.3 microns.

As shown further by the graph of FIG. 2, the ratioing technique of the dual wavelength thermometer (line 1) provides a more accurate indication of the true temperature of each specimen (line 3) than the single wavelength indication (line 2). The measurement represented by line 3 was provided by a highly accurate, calibrated thermocouple device disposed in physical contact with the surface. A calibrated thermocouple with a pointed probe or probes can be conveniently employed for this purpose, the probes being easily inserted into the object under test, and then removed after a reading of true temperature is obtained.

It will be noted that the temperature measurement of specimens 34 to 37, in FIG. 2, indicates variations in surface emissivity between each specimen when using the single wavelength radiation thermometer (line 2). The dual wavelength radiation thermometer (line 1), however, essentially ignores these variations for specimens 34 to 37.

FIG. 3 shows curves that are constructed to show errors in temperature measurements of a black body and three non-black body surfaces each with a different, less than unity, emissivity value ($E_1$ to $E_3$), with measurements taken at a single selected temperature value. Note that there is a slight uncertainty between the thermocouple measurement represented by horizontal solid line 5 and line 6.

The degree of error in radiation thermometer measurement in FIG. 3 is represented by points located on two parallel Y axes, the axis on the left representing the output of a dual ratio ($\lambda_1/\lambda_2$) radiation thermometer, while the axis on the right is the output of a single wavelength ($\lambda_1$) radiation thermometer. Between the error points, dash lines are drawn to indicate the locations at which they cross the zero error curves 5 and 6. By combining these errors in accordance with the principles of the present invention, a reduced final error is effected, as indicated by the range of minimum error condition labeled in the presentation of FIG. 3.

Figure 4:
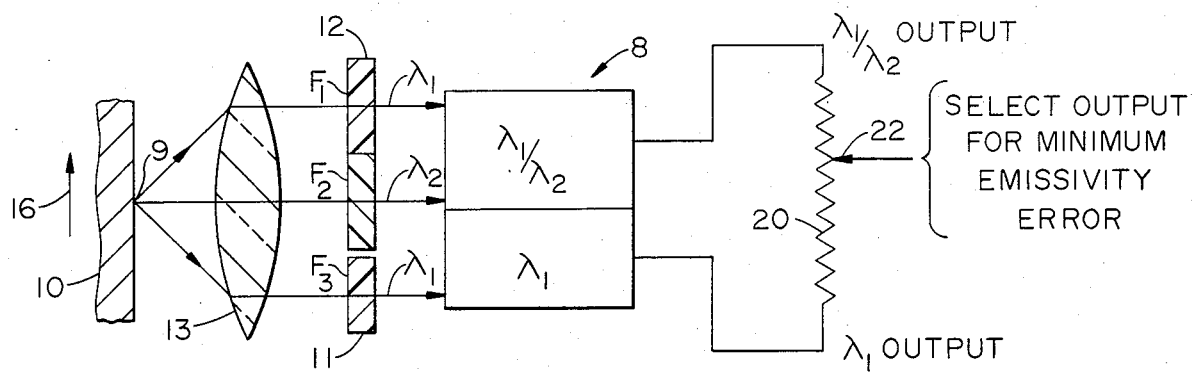
FIG. 4 shows schematically an arrangement for electrically adding single and dual wavelength radiation measurements to obtain the desired minimum emissivity error result.

FIG. 4 shows an arrangement for combining (electrically adding) the outputs obtained from single and dual wavelength measuring techniques to attain the desired minimum error result. More particularly, a box 8 is diagrammatically shown which represents a radiation sensor and associated electronics for the two measuring techniques. Preferably, the invention uses a single sensor 8 simultaneously receiving infrared radiation at a single wavelength and at two wavelengths from the same narrow portion 9 of a surface of a heated object 10. This can be effected by the use of appropriate optical filters 11 and 12 and common optics 13. A single sensor is advantageous from the standpoint of minimizing sensor and circuit error, i.e., any inherent inaccuracy between sensors and associated circuitry increases the opportunity for error.

A similar advantage occurs by viewing simultaneously an identical narrow discreet portion or area of the surface, as such a portion will have only one emissivity.

As seen in FIG. 4 of the drawings, sensor 8 receives radiation, indicated by dash lines, from a discreet area 9 of the object 10 being examined. If the object is moving relative to the sensor, as indicated by arrow 16, both sensing techniques, i.e., both single and dual wavelength measuring arrangements, receive radiation simultaneously from the same discreet area 9 of the surface, The outputs of the two sensing arrangements are shown directed respectively to the ends of a potentiometer 20, which potentiometer combines (adds) the outputs. A readout of the resulting combination signal is available on a movable tap 22 of the potentiometer. By proper positioning of the tap, the minimum error range depicted in FIG. 3 of the drawings is obtained, i.e., summation, as explained earlier, permits proportionate selection of the output signals of the two measurements, the values of which are on opposite and unequal sides of the true temperature of object 14. In viewing the graph of FIG. 3, and particularly the X axis thereof, it will be noted that the outputs of the two sensing techniques have an error spread for three ($E_1$ to $E_3$) surfaces or surface portions measured. The extremes of the X axis, i.e., the Y axes of the graph, represent the ends of potentiometer 22. A workman moves tap 22 of the potentiometer between the extremes thereof until an output is obtained that is the same as or closest to the temperature measured by the thermocouple device discussed above. This is the position on the graph of FIG. 3 providing the zero or "minimum error range". The instrument of sensor 8 is now ready to measure the temperatures of a plurality of surfaces or surface portions with minimal error that the changing emissivities thereof would otherwise cause, as the two measurement techniques ($\lambda_1$ and $\lambda_1/\lambda_2$) offset each other for future measurements.

While the invention has been described in terms of preferred embodiments, the claims appended hereto are intended to encompass all embodiments which fall within the spirit of the invention.

What is claimed is:

1. A method of measuring the surface temperature of heated metal objects having changing unknown emissivities that are less than unity, the method comprising the steps of:

providing an object having a heated surface radiating infrared energy therefrom;

determining true surface temperature of the object by making an initial measurement thereof that is separate from measurements of infrared energy radiating from the object;

measuring infrared energy radiated from a narrow selected portion of the surface at two different, but closely adjoining wavelengths;

rationing the measurements of the energies at the two wavelengths to provide a first output signal that is a function of the ratio of the infrared energies radiating from the selected portion of the surface at the two wavelengths;

simultaneous with the step of measuring the infrared energies at the two closely adjoining wavelengths, measuring infrared energy radiating from the same narrow selected portion of the surface at one of the wavelengths and providing therefrom a second output signal that is a function of the radiated infrared energy at the one wavelength;

said first measurement and output signal containing errors in the amount of infrared energy radiated from the surface due to the changing emissivities thereof such that the first output signal represents a temperature value that is greater than the true temperature of the surface;

said second measurement and second output signal containing errors in the amount of infrared energy radiated from the surface due to the changing emissivities thereof such that the second output signal represents a temperature value that is less than the true temperature of the surface, and by an amount that is considerably greater than the amount that the temperature value of the first output signal is different from the true temperature;

correcting for the changing unknown emissivities that affect the amount of infrared energy radiated from the surface by electrically adding the output signals of the first or second measurements;

selecting proportions of the output signals in a manner that allows use of the first or second measurement, or any combination thereof; and providing thereby means to adjust the output signal such that it represents the true surface temperature, as determined by the initial, separate measurement of true surface temperature.

* * * * *